INVENTOR.
Walter H. Green,
BY Robyn Wilcox
Atty

Aug. 12, 1947.  W. H. GREEN  2,425,372
APPARATUS AND PROCESS FOR IMPROVING SEPARATION OF CLARIFIED LIQUID
FROM A SLURRY BY MAINTAINING A SLURRY CIRCULATION INCLUDING
A FLOW OF SLURRY ADJACENT THE SEPARATION INTERFACE
Filed Jan. 7, 1943  3 Sheets-Sheet 2

INVENTOR.
Walter H. Green,
BY

Aug. 12, 1947.  W. H. GREEN  2,425,372
APPARATUS AND PROCESS FOR IMPROVING SEPARATION OF CLARIFIED LIQUID
FROM A SLURRY BY MAINTAINING A SLURRY CIRCULATION INCLUDING
A FLOW OF SLURRY ADJACENT THE SEPARATION INTERFACE
Filed Jan. 7, 1943   3 Sheets-Sheet 3

INVENTOR.
Walter H. Green,
BY

Patented Aug. 12, 1947

2,425,372

UNITED STATES PATENT OFFICE 2,425,372

APPARATUS AND PROCESS FOR IMPROVING SEPARATION OF CLARIFIED LIQUID FROM A SLURRY BY MAINTAINING A SLURRY CIRCULATION INCLUDING A FLOW OF SLURRY ADJACENT THE SEPARATION INTERFACE

Walter H. Green, Batavia, Ill., assignor to Infilco Incorporated, Chicago, Ill., a corporation of Delaware Application January 7, 1943, Serial No. 471,635

26 Claims. (Cl. 210—16)

The present invention relates to the treatment of aqueous liquids, and particularly refers to an improved method and apparatus for the removal of undesirable substances from such liquids.

A principal object of the present invention is the softening or clarifying of water by treatment of water with a precipitate forming reagent in a dense slurry containing a substantial quantity of solids accumulated while in a state of suspension from previously treated water.

A further object of the present invention is to provide improved method and apparatus for the utilization of what is known as the slurry process in the treatment of such liquids as in the softening and clarification of water.

Another object of the invention is to provide an improved method and apparatus for maintaining, in a water treatment process utilizing a slurry, the solids in suspension in a tough and integrated condition.

Another object of the invention is to provide an improved method and apparatus for maintaining, in a water treatment process using a slurry, a uniform suspension of solids throughout the body of such slurry. Closely related objects to that just stated are the avoidance or overcoming in the process and by the apparatus of zones of more or less stagnant slurry and of conditions conducive to classification of solids.

An additional object of the invention is to provide an improved apparatus and process for avoiding classification of solid particles in a slurry used in a water treatment.

A specific object is to improve flow conditions in apparatus of the type in which the water on its way to the escape surface of the slurry is confined in, and abandons solids in, a chamber wherein water and solids must pass to an outlet in counter, or conflicting, directions.

Another object of the invention is to provide a method of facilitating escape of clear water from slurry in a process wherein the water to be treated and a precipitating reagent are mixed in and with a slurry containing a substantial quantity of solids accumulated from a large quantity of previously treated water, the mixture is introduced into the lower portion of an upwardly expanding clarification zone, solids are caused to rise to a predetermined level in said clarification zone a substantial distance above the level of the entry of the mixture thereinto to form a suspended blanket of solids in the lower portion of said zone, and clarified water is withdrawn from the upper portion of said clarification zone.

A still further object of the invention is to improve the operation of apparatus and process such as that described in my prior Patents Nos. 1,702,256 and 1,702,257 issued February 19, 1929, the patents to Spaulding, No. 2,021,672, issued November 19, 1935, and No. 2,127,314, issued August 16, 1938, and others wherein a portion of the slurry is contained or confined in a clarification chamber under what may be spoken of as a more or less stagnant condition.

These and other objects of the invention and the principles employed will be apparent from the specification and claims which follow. From the illustrations it will also become apparent how my invention may be utilized in ways other than the express forms set forth.

It has heretofore been known, as shown in the patents above mentioned, to treat water and other liquids by processes in which the water and a precipitating reagent were mixed with a slurry containing solids separated and accumulated from previously treated liquid, the so formed mixture then passing into an upwardly expanding clarification zone in which the rate of rise gradually decreases to a point that will no longer support the solids, thereby providing for the separation of clarified water from the suspension of solids and water. One form of such apparatus is shown in my prior patents above referred to. Another type is shown in the Spaulding patents above mentioned, which provide a tank divided by a sloping wall structure into a lower mixing and reaction space and an upwardly expanding clarification zone. The clarification zone and mixing space communicate at the lower end of the clarification zone. In these patents, the clarification zone is shown as overlying the mixing space. In all such structures, water and a treating reagent are introduced, either separately or together, into the mixing space where they are rotatively agitated in and with the liquid and suspended solids already in the structure by some suitable means, such as the jet in my prior patents above mentioned or the slowly revolving agitator of Spaulding. The mixture then flows into the lower part of the upwardly expanding clarification zone at a velocity which will maintain the solids in suspension in the liquid and carry them along and, as the water rises therein, its velocity will gradually decrease due to the increase in cross-sectional area of the zone, and finally reach a point at which solids will no longer rise with the water. At this point separation takes place, the water rising away from the solids in a clarified condition, while the abandoned solids aggregate into larger particles and settle back, some descending vertically through the lower opening but the majority depositing on the sloping surface and sliding back. This action provides for the gradual building up of a suspension in the lower part of the clarification zone and in the mixing space, which, in the clarification zone forms what is commonly called a "sludge blanket" or "suspended sludge filter," which "sludge filter" or blanket facilitates the removal of solids from the suspension entering the clarification zone; and in the mixing and reaction space provides a quantity of solids which can be mixed with the incoming water and reagents and act as seed. Experience has shown that in such types of apparatus the rate of rise of water in the clarification zone at the level where the solids cease to rise and the clear water escapes from the slurry surface is not often more and often is less than approximately one and one-quarter gallons per square foot per minute. I have found that considerably higher rising or escape rates can be secured by the very simple process and apparatus of my invention.

It is obvious that in the type of structures described in the above mentioned patents, there is no definite circulation of water or solids from the upper portion of the suspension of solids in the clarification zone back into the mixing space. In the prior structures above mentioned the intent or effect has heretofore been to prevent or avoid circulation and to maintain a condition of quiescence in the clarification zone. In such apparatus the condition at, and for a distance below, the surface of the suspension or slurry is that of a substantially vertical rise of water toward the slurry surface, the idea being, as generally described, to effect a filtration of the rising water through a so-called "sludge blanket." While the shape of the clarification zone may vary, in general the slurry or sludge blanket through which the water rises is several feet in depth. I have heretofore observed that with such apparatus and operation there tends to be a classification of the slurry, lighter particles tending to collect at the top and the heavier and denser particles failing to rise above the lower portion of the clarification zone. This has the disadvantage that the rate of rise at which clarified liquid separation can take place is that at which the lightest and smallest particles will no longer rise with the water but be abandoned. I have further found that when the particles and particularly the lighter and more delicate particles are held stagnant so to speak, or isolated for a period in the clarification zone without return to the mixing space where they may be reinforced, there is some tendency for them to disintegrate, resulting in a carrying over of the finer particles unless the throughput of the apparatus is maintained at a low figure.

I have further found that when the water in the clarification zone rises vertically through a sludge blanket to and through the escape surface, the separation of water from the suspension is less rapid and less complete than if, in the upper level of the suspension at or adjacent the escape surface, there is a noticeable, but non-turbulent, horizontal movement of the slurry.

In my prior Patent No. 2,276,300 issued March 17, 1942, I show a means to effect a skimming of top solids and a circulation of solids from that level back into the mixing and reaction space whereby solids abandoned by escaping water do not have to settle back against the rising current but may drift laterally to the skimming edge.

The structure of this patent last mentioned was designed in accordance with current conception and practice, to definitely maintain quiescent conditions in the upwardly expanding clarification chamber. I have since found, however, that improved results can be secured by disregarding the conception that quiescent conditions are necessary in this chamber. I do more than merely omitting structure which creates the quiescent condition, for I entirely upset the quiescent or stagnant condition of the clarification space, and particularly in the upper portion of the slurry adjacent the escape surface, to effect a positive controlled circulation therein and therefrom, not only in the lower portion thereof but up to, and including, the interface between the slurry and clear water. That is, the types of structure mentioned in the above patents can be more efficiently operated if there is a definite circulation of a relatively large and predetermined quantity of slurry at and from adjacent the clear water escape surface.

Briefly, therefore, when considering the process of my invention, it involves the maintenance of a forced movement of a substantial quantity of slurry adjacent the interface dividing slurry and clear water, and the return of a large volume of slurry from that level into the mixing and reaction space, whereby the quiescent or static conditions of prior practice are done away with and instead a dynamic condition of movement in considerable amount is maintained. When considered as an apparatus my invention discloses means whereby such a movement of desired kind or pattern can be efficiently and economically secured and controlled. I have in mind more than merely preventing the classification effect, or stagnant condition, which exists in the upwardly expanding clarification zone when there is no definite provision for a forced circulation of slurry therefrom. I have in mind to create a condition wherein the approach of the water to the escape surface is not through any quiet depth of slurry but wherein there is a substantial movement of slurry at or closely adjacent to the slurry surface. Preferably this motion is horizontal, or at least has a very substantial horizontal component, and so far as I now know, the closer this movement is to the slurry surface the better the results will be, although it is obvious that such movement may extend for some distance below the surface as well. So far as I have observed there tends to be a sort of skin of solids at the top of the slurry that is not necessarily permanent or fixed, either as to position or contents, that seems to have less horizontal motion than the slurry below it. The rate of escape of clarified water per unit of area and the permissible horizontal flow will both vary with the character of the slurry, which will depend upon the impurities in the water and the kind of treatment to which it is subjected. While any horizontal velocity of movement is better than none, I have found that desirably the velocity should tend to be toward some maximum amount permitted under any particular operating conditions rather than a barely perceptible amount. By maintaining the horizontal velocity at such a value I am able to secure an increased output of water from the apparatus. I have further observed that if the rate of return or recirculation is of the order of about equal the amount of throughput through the apparatus, and the circulatory flow is directed horizontally at a level adjacent the slurry surface, and in such a pattern as to sweep the whole area without creating any turbulent condition, very good results are secured. Such a circulation must of course be induced by mechanical means, such as a pump or some form of liquid impeller, and cannot be secured by gravity only as shown in my prior Patent No. 2,276,300, which secures a flow by the gravitational effect of the thickened solids and is therefore unable to secure such a flow as I now require. One effect of such movement of slurry adjacent the surface of the slurry, or interface between it and the clear water, is to increase the rate of escape of clear water from the slurry surface by an amount that may be twice, or even more, that which can be secured in the ordinary type of such structure which does not have the forced circulation herein mentioned. Why such a movement or circulation as that now proposed permits the escape of clear water from the horizontally moving surface, or interface, of slurry at a higher rate than the escape from such surface when the direction of flow is substantially vertical toward the surface is not entirely understood but I believe it is due in part to the prevention of the accumulation of lighter particles at the surface and in part also to the carrying away of all abandoned particles in a way that results in less interference with the escape of clear water.

I have further observed that it is desirable to return the slurry from adjacent the slurry interface to the reaction chamber, or space, so that the solids will be fortified, and enabled to grow, prior to their return to the clarification zone. While a considerable improvement may be secured by circulating the slurry within the limits of the clarification zone, it is preferred that the circulation be between the upper part of the slurry pool in the clarification zone and the mixing and reaction space as shown and described. Another effect is that such a circulation by constantly drawing solids rapidly through the lower part of the slurry clarification zone, is to prevent the classification of solids therein. This probably plays a part in permitting the escape of clear water from or at the slurry-water interface at a higher rate in that the particles there will be on the average larger and heavier. It is preferable in the practice of my invention that the return of slurry from the slurry interface be of a considerable volume, preferably of the order of the rate of throughput, or even more, and be maintained independent of the weight of solids circulated.

Further objects of my invention, therefore, are to prevent the classification effect and the stagnant effect spoken of, and to maintain good escape surface conditions in apparatus where there is an isolated or stagnant solids condition in the clarification zone, while retaining advantageous structural features of such apparatus.

It is also an object of my invention to provide for a more or less horizontal movement of slurry adjacent the upper surface of the suspension or slurry, whereby the abandoned solids are rapidly carried away by a flow so as to permit a more complete and more rapid escape of clarified water from the suspension or slurry.

It is further an object of my invention to provide in apparatus of the kind described, for a controlled circulation of a considerable volume of slurry between the upper part of the slurry in the clarification zone and the mixing and reaction chamber.

For purposes of illustration I am describing my invention in connection with the well known form of apparatus having an upwardly flaring upper chamber although the chamber need not be of this form but may vary, as, for instance, it may be cylindrical. The advantage of the conical, or downwardly tapering shape, for my purposes lie in the way of providing a maximum escape surface between slurry and clear water, with small clarification zone volume and larger reaction zone volume, in a given size tank, and also, in some forms, of effecting a desirable gradual reduction to the desired propeller diameter. Such construction prevents undesirable deposit of solids in said upper zone while permitting the use of a relatively small impeller. In fact I may use the lower portion of this upper chamber for mixing and reaction and so obtain a further reduction in size of the apparatus.

The invention will be readily understood by reference to the drawings in which similar reference characters indicate similar parts in the several figures.

Figure 1:
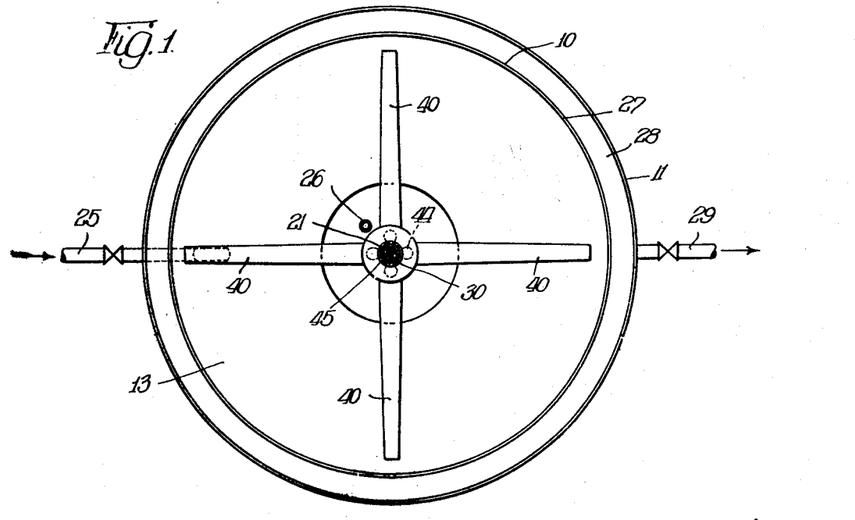
Figure 1 is a plan view, with the motor and supporting beams removed, of one embodiment of my invention.
Figure 2:
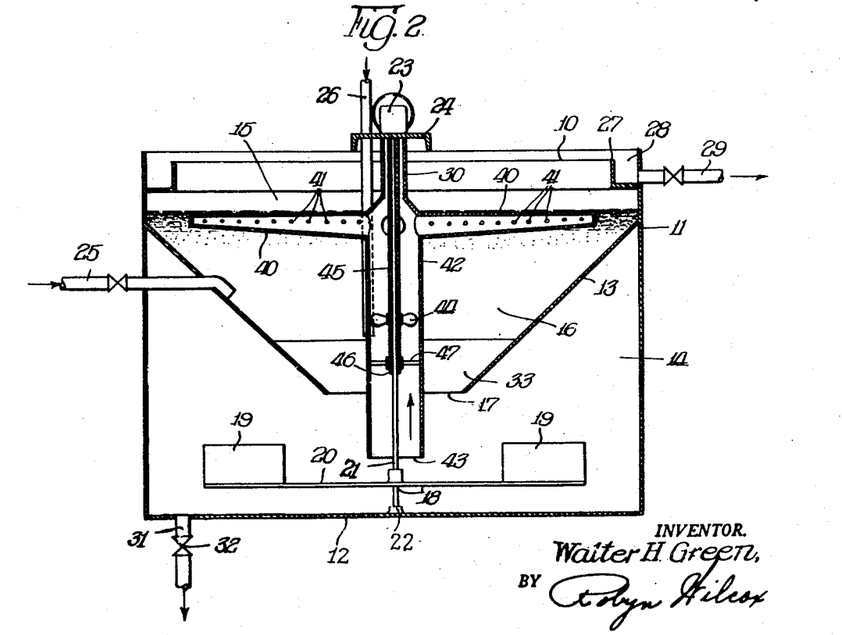
Figure 2 is a vertical cross-sectional view of the apparatus disclosed in Figure 1.
Figure 3:
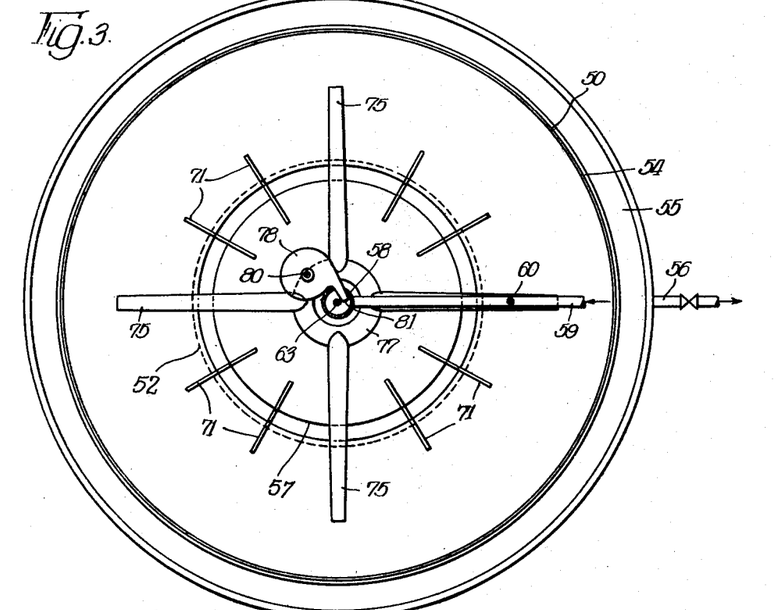
Figure 3 is a plan view, with the motor and supporting beams removed, of another embodiment of my invention.
Figure 4:
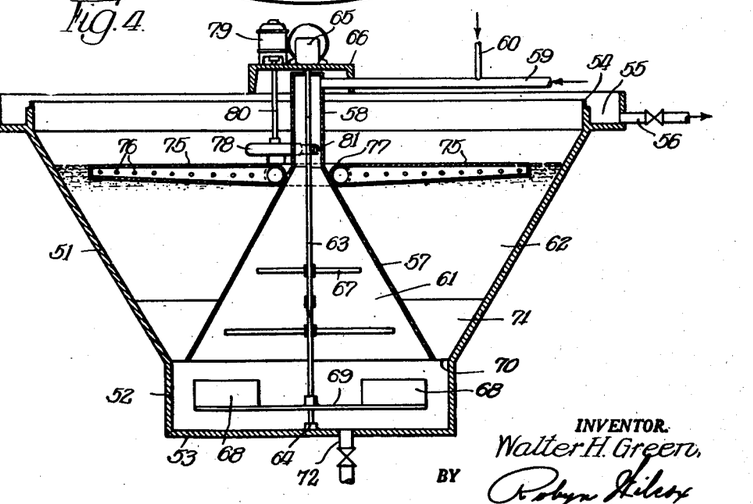
Figure 4 is a vertical cross-sectional view of the apparatus shown in Figure 3.

Figures 1 and 2 disclose the invention as applied in an apparatus having the conical clarification zone of my prior patents above mentioned and Spaulding Patent No. 2,021,672. The apparatus comprises any suitable tank or basin 10 which may be of any desired shape or size, but which is shown in the drawing, for purposes of illustration, as being circular and formed by the side wall 11 and bottom 12. Suspended in the basin 10 is a sloping wall structure 13, which in the circular structure shown will be an inverted truncated cone, dividing the tank 10 into a lower agitation space 14 and a superposed downwardly tapering quiescent zone or chamber which is functionally divided into an upper clarified water space 15 and a lower flow space 16, which in the operation herein described will constitute a mixing and first reaction zone or space. In such a structure the lower agitation space can be considered as an outer flow chamber and the quiescent zone as an inner flow chamber although the functions of such inner and outer chambers are reversed in the structure of Figures 3 and 4. The sloping wall structure 13 terminates, as at 17, in an open passageway spaced above the floor 12 of the basin. In the lower portion of the agitation space is a slurry moving member, or agitator, 18, which comprises a plurality of paddles 19 supported upon suitable cross members, or arms, 20, which in turn are mounted upon a shaft 21. The shaft 21 may be journaled in any suitable bearing, such as 22, and driven by any suitable means such as motor and speed reducer 23, supported above the tank by beam 24. Water to be treated and chemical reagent may be introduced separately as shown in Figures 1 and 2 or together as shown in Figures 3 and 4. The apparatus shown in Figures 1 and 2 shows one method of introducing the water and chemical reagents in which the raw water is introduced into the mixing and reaction space by means of pipe 25, and the chemical by means of chemical feed pipe 26, both discharging into the mixing and reaction space 16, as shown. If the direction of circulation through the conduit 42, hereafter to be described, is reversed, as it well might be and good results secured, the water inlet and chemical inlet would discharge into some other portion of the tank, such as into the agitation space 14 or the conduit 42. Clarified and treated water is withdrawn over a weir 27 into a launder 28 in the upper part of the upper chamber and is taken to a point of use through outlet pipe 29 leading from the launder 28. A protecting cylinder 30 surrounds the shaft 21 to prevent turbulence in the upper part of the upper zone. The apparatus may be drained if necessary by any suitable means such as a drain 31 provided with a suitable valve 32. The drain 31 may also be used to withdraw solids to waste as they accumulate in the apparatus, or a solids concentrator, such as described in my copending application, Serial No. 381,364, not shown herein, may be used in either the agitation space or in the lower part of the quiescent zone. Baffles 33 may be placed in the lower part of the conical structure 13 to prevent uncontrolled rotation of liquid in the quiescent upper zone if the circulation is reversed from the preferred form hereinafter described. The structure heretofore described is similar to that of the above mentioned patents and is not claimed herein.

My invention comprises a means for providing and maintaining a forced circulation between an intermediate level of the upwardly expanding zone and the agitation space and a lateral movement adjacent the slurry surface. Various types of structures for maintaining such circulation could be suggested by those familiar with the art, but for purposes of illustration I may use a plurality of distribution arms or members 40 extending across the area of the conical structure at an intermediate level therein, and preferably immediately adjacent the predetermined upper limit of the slurry, or "sludge blanket" as it is sometimes called, in the vertically tapering chamber 13. It should be noted that the distance of the distribution arms 40 below the escape surface, or "slurry interface" as it is sometimes called, is not critical. It is important to control motion at the escape surface, preferably at or near a maximum lateral flow which, of course, should not become turbulent. A pronounced but non-turbulent flow at the escape surface is highly desirable, but it is obvious that such a flow can be secured with the distribution arms at varying distances below the interface, and will depend to a large extent on the volume and velocity of the horizontal flow at or from the distribution arms 40 as well as their distance from the interface. The distribution arms 40 are provided with a plurality of orifices or outlets 41 preferably placed so as to discharge laterally from the distribution members so as to increase the horizontal movement of slurry across the predetermined upper surface of the slurry within the cone 13. The distribution arms 40 open into a flow conduit 42 which leads from the agitation space at a point removed from the passageway 17 between the upwardly expanding zone and the lower space. In the type of structure shown, i. e., one in which the conduit leads vertically through the open lower end 17 of the cone 13, the conduit 42 may open from adjacent the floor, as at 43, so that the slurry entering thereinto will be picked up from the lower portion of the body of slurry, and from a portion in which the agitational effect of the paddles 18 provides for a well mixed and uniform slurry. Obviously the conduit 42 could lead, with equally good results, horizontally into the upwardly expanding zone from an upper part of the mixing and reaction space as shown in Figures 3 and 4. The important consideration is that the conduits be so arranged as to require mixing of the water and reagent in, and with, the slurry and a return of slurry from the escape surface back to the body of slurry in such a way as to avoid short circuiting to the slurry surface in the upper chamber. In the form shown in this embodiment, the flow is upwardly in the conduit 42 through the distribution arms 40 and is discharged horizontally through the orifices 41. After passing horizontally for a distance the slurry will be withdrawn downwardly through the lower part of the cone 13 and is discharged through the lower communication 17 into the pool of slurry in the agitation zone 14.

The conduit 42 is provided with a pumping means of any suitable design for securing an enforced and controlled flow of slurry through the conduit. A simple type of structure is shown in Figures 1 and 2 where the pumping means comprises a liquid impeller 44 mounted upon quill shaft 45 likewise driven by motor-reducer 23 and journaled in a bearing 46 supported by a spider 47 in the conduit 42. In a structure of this type it is preferred that the impeller 44 rotate at a speed considerably in excess of that of the agitator 18 so that the motor-reducer 23 will drive the two shafts 21 and 45 at different speeds. In small devices of this type the agitator 18 can sometimes be eliminated as the pumping effect of the impeller 44 will be sufficient to maintain the solids in suspension in the lower space 14.

The operation of the apparatus herein described will be readily understood. Water to be treated is introduced through raw water inlet 25, which discharges into the lower flow space 16 and reagent is supplied through feed line 26. It will be understood, however, that water and reagent can be introduced in any part of the path of circulation, so long as sufficient time is permitted for water, reagent and slurry to react before coming to the escape surface. The agitator 18 is rotated to secure a thorough mixing of the raw water with the slurry which is in the agitation space, thereby forming additional slurry of the liquid undergoing treatment and solids accumulated from previously treated liquid. In structures of this type the desired height or depth of slurry in the lower part of the cone 13 can be readily determined by those familiar with the art, and preferably will be maintained at a level a substantial distance above the bottom and a substantial distance below the weir 27. The distributor arms 40 are placed adjacent the predetermined upper level of the slurry body within the upper zone. The operation of the impeller 44 will draw slurry in from the agitation zone 14 and discharge it through the distribution arms 40 and the orifices 41, and such slurry will then pass downwardly through the lower flow space 16 into the agitation space 14. It will be found that the effect of such a flow will be to cause a substantial, or pronounced, movement of slurry horizontally under the upper surface of the body of slurry within the upwardly expanding zone 13, especially when the desired return flow is of the order of about equal the throughput of the apparatus, or more. I have found that the clear water escapes from the horizontally moving slurry much more readily, and with a smaller amount of suspended solids therein, than is the case when the water escapes from a quiescent or stagnant slurry surface. As indicated above, while a barely perceptible flow is better than none, a pronounced flow is more beneficial. While there is no critical lateral velocity, it appears that the horizontal movement should have a velocity of at least the order of the vertical rise, but it also seems that it can be considerably more or somewhat less depending on the depth of the laterally moving strata of water. What apparently is desirable for the maximum rate of escape of water is that the velocity and volume of the laterally moving slurry be sufficient to supply the amount of water escaping plus a residual amount to carry away the abandoned solids. It is practically impossible to have these flow conditions under the whole surface area so that there may be different conditions existing as to movement and also, as to escape in different parts of the surface. However, there will be an average throughput rate that will give the intended capacity.

The slurry so discharged through the distribution arms 40 will return into some portion of the agitation space 14 where the discharging slurry will be thoroughly mixed in and with other slurry in the zone before again returning to the clarification zone. As indicated previously, the flow of slurry to the escape surface above described will be preferably of the order of about twice the throughput, or perhaps even greater, and the return flow to the agitation space will therefore be at least equal to the throughput, or more. Such a flow constantly returns solids from the upper surface of the slurry in the downwardly tapering zone, which prevents the disintegration of solids normally occurring in such a slurry if they are permitted to remain stagnant there, and it also provides for a constant flow of slurry through the lower part of that zone, thereby preventing classification or stratification of solids therein. These results, together with the more efficient separation of clear water from a horizontally moving slurry commonly permits structures of the old type to operate at approximately twice the capacity heretofore possible. It is apparent that with my invention the feature of an upwardly expanding zone is no longer critical. With the circulation and operating conditions above described, a cylindrical chamber is practical.

The movement of slurry herein described has the effect of preventing classification of particles in the quiescent zone, which was a defect of prior art structures; provides a slurry of more uniform particle size as the finer solids, which formerly remained at the interface, are returned to the reaction space for further growth; quickly removes abandoned solids from the zone where they are abandoned so that they cannot interfere with the process; and by preventing a stagnant condition at the interface, expedites the escape of clear water. It is also evident that by means of the recirculation thus secured, the maintenance of the slurry-water interface, or escape surface, at a predetermined level is readily secured—which is not true in the operation of the apparatus of the prior art. It is apparent that the horizontal flow at the escape surface and the carrying away of the solids abandoned by the escaping water are important in providing for more efficient escape of clear water from the slurry. These two elements are actually part of the same operation. It should be noted that in my process and apparatus I avoid the filtering action of water rising through a blanket of slurry and therefore I definitely avoid permitting a "sludge blanket" or "sludge filter," as those terms are commonly understood, to form below the escape surface.

In the preceding, the flow has been described as downwardly in the conical space 16 and upwardly through conduit 42. It is entirely practical to reverse this flow and get good results as the main principle of my invention and the effects thereof are being utilized, and in some instances it may be more convenient or otherwise desirable to so operate.

The Figures 3 and 4 disclose my invention utilized in a structure of the type illustrated in Patent No. 2,127,314. The structure comprises a tank 50 which may be of any suitable size and shape but which is shown in the drawing as being circular. The tank is provided with a sloping wall 51 to form an outwardly expanding chamber, a short vertical wall 52 at the lower end of the sloping wall, and a bottom 53. Adjacent the upper end of the sloping wall 51 is a weir 54 separating the upper portion of the tank from a launder 55 which communicates with a treated liquid outlet 56. Axially aligned in the tank 50 is a cone structure 57, the base of which terminates adjacent the upper end of the vertical wall 52, and the upper end of which terminates in a cylinder 58, through which water and chemical can be introduced. In the structure shown in these figures the raw water inlet 59 discharges into the upper portion of the cylinder 58. In this embodiment the chemical is shown as introduced through chemical inlet line 60, which discharges into the raw water inlet 59, although if preferred, due to the nature of the water, the chemical can be separately introduced into the circulating slurry. The conical structure 57 and its associated cylinder 58 divide the tank into a mixing and reaction space 61 and an upwardly expanding zone 62. Within the mixing and reaction space is a vertical shaft 63 mounted in a suitable bearing, such as 64, and driven by a suitable motor-reducer 65 which is supported on beam 66 above the tank. The shaft 63 is provided with a plurality of agitating bars 67 and paddle members 68 mounted on arms 69, the latter being in the lower portion of the mixing and reaction space, which may be the portion enclosed by the vertical walls 52. The conical wall 57 preferably terminates short of the walls of the tank so as to provide a continuous communication 70 between the mixing and reaction zone 61 and the upwardly expanding zone 62. Preferably a plurality of vertically extending baffles 71, adjacent the passageway 70, will prevent uncontrolled rotation of liquid in the upwardly expanding zone. A valved drain 72 leads from the bottom 53 of the tank.

Associated with the structure of Figures 3 and 4 above described, which is not new and not claimed herein, I place a means for maintaining a forced circulation of slurry between the upwardly expanding and the mixing zone and a desired horizontal movement in the upper part of the slurry in the expanding zone. Such structure may comprise suitable pick-up arms or members 75 extending across the upwardly expanding zone 62 and provided with a plurality of orifices or inlets 76. Preferably the various pick-up arms 75 will lead to a common conduit 77 which in turn communicates with the suction side of a pump 78. The pump 78 is driven by a motor 79 with which it is connected by means of a shaft 80. The outlet 81 of the pump 78 may be into any portion of the mixing and reaction zone but, as shown, may discharge tangentially in the upper part of the mixing and reaction zone, whereby the returned slurry will be thoroughly mixed with incoming raw water and precipitating reagents.

The operation of the structure shown in Figures 3 and 4 will be understood from the description of the operation of the apparatus of Figures 1 and 2. It will be obvious that the direction of flow may be reversed so as to provide for flow from the mixing zone 61 through pickup members 75 into an intermediate level of the upwardly expanding zone 62 with clear water going upwardly from such level to the launder 55 and slurry being returned downwardly therefrom into the mixing zone 61. In this event the flow in the lower part of the upwardly tapering chamber is the exact opposite of that desired and described by prior patents.

Figure 5:
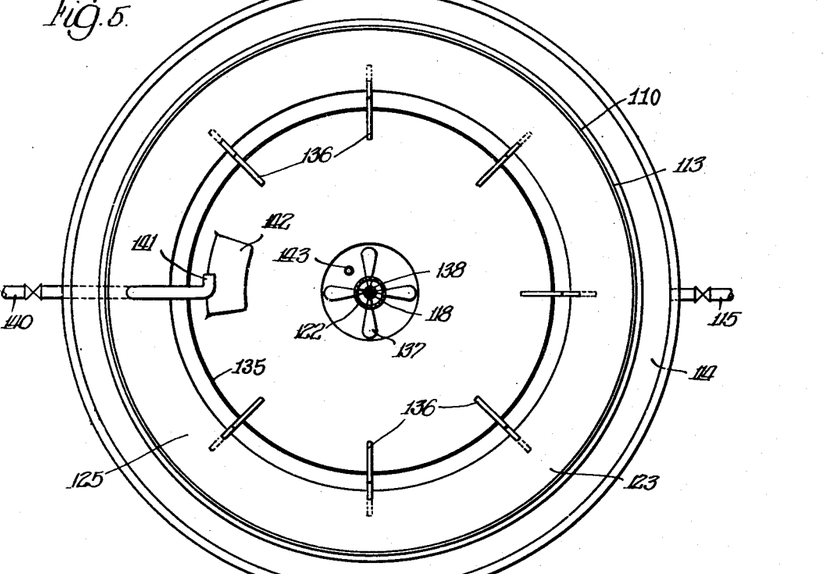
Figure 5 is a plan view of another preferred form of my invention.
Figure 6:
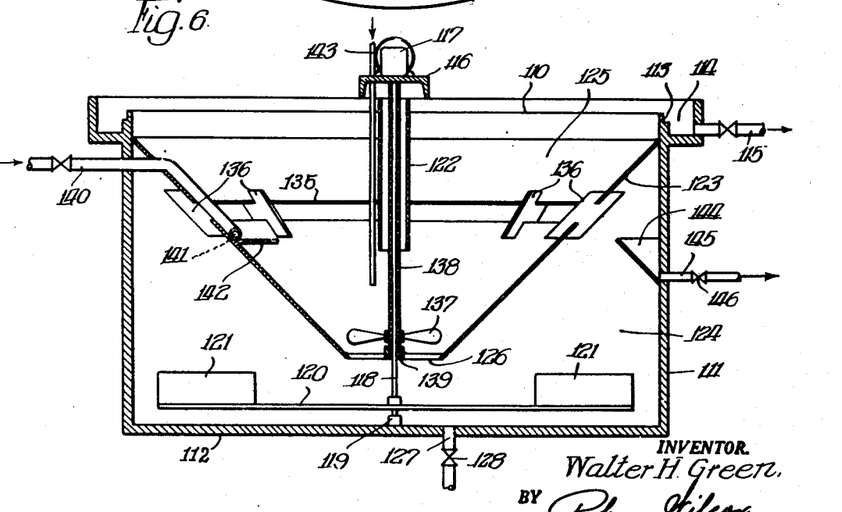
Figure 6 is a vertical cross-sectional view of the embodiment shown in Figure 5.

The apparatus of the third embodiment may be constructed in any suitable tank 110, such as the circular form shown in the drawing, or rectangular, or any other desired shape. In the form shown in the drawings for illustration, the tank is formed by a vertical wall 111 and a substantially horizontal floor 112. Treated water is withdrawn from the upper part of the tank over a weir 113 into a launder 114 from whence it is withdrawn to use through an outlet conduit 115. Supported above the liquid level within the tank by any suitable means, such as beam 116 is a motor-reducer 117 which drives an agitator shaft 118 vertically placed along the axis of the tank. The agitator shaft 118 can be journaled in suitable bearings, such as 119, and on it is mounted an agitator member comprising arms 120 to which are affixed paddle blades 121. A cylindrical tube 122 of suitable size surrounds shaft 118 to prevent rotation of the shaft from causing agitation in the upper part of the tank.

A sloping wall structure, which in a circular tank will preferably take the form of an inverted cone 123 is supported in the tank, thereby dividing it into a lower agitating space 124 and an upper zone or chamber of downwardly decreasing cross-sectional area 125. The cone structure 123 is open at its lower end 126 to afford communication between the lower space 124 and the tapering zone 125. A suitable drain 127 provided with valve 128 permits draining the apparatus if desired.

The structure just described is not new and is not claimed herein. For my purposes I modify such a structure to practice the process of my invention. The essential element of the modification comprises means for causing and directing a flow inwardly through an upper inlet into the downwardly tapering zone 125 from the lower space 124 and downwardly in the lower portion of the tapering zone to and through an outlet to the lower zone. For purposes of my invention I provide a relatively large inlet into the upper portion of the zone of downwardly decreasing cross-sectional area, preferably at a level well above the lower end of the cone structure and usually nearer to the treated liquid withdrawal weir 113 than to the lower opening 126. In any event, this inlet should be adjacent and below the desired level of the escape surface. Such an inlet may take a variety of forms such as the continuous slot 135, shown in the drawings, or, instead, a plurality of inlet openings, not shown, may be provided. The size and disposition of such inlet should be such as to permit a flow therethrough of about two times, or more, the throughput of the apparatus without causing turbulent conditions at the escape surface. The actual velocity of entry will preferably vary with such things as the size of the upper chamber and the nature of the particular slurry and the direction of entry. It should be such as to cause definite horizontal movement in the upper portion of the slurry in the upper chamber and will usually and preferably be within the limits of about one inch to twelve inches per second. Higher velocities of entry may be used if the entering flow is so directed as not to itself form the horizontal flow in the upper portion of the slurry in the upper chamber, but to induce such flow. Preferably a plurality of baffles 136 will be provided on the conical wall 123 which not only have the effect of strengthening the conical structure at the region of the slot 135 but also of reducing the swirling of the slurry entering from the mixing and reaction zone 124 and directing it more or less radially into the zone 125. The design of the inlet or slot 135 and the baffles 136 should be such as to provide for a pronounced but non-turbulent flow of slurry from the mixing and reaction zone 124 into the upper chamber or zone 125. In such a flow some rotation is not undesirable but means should be provided to prevent it from becoming excessive.

Functionally association with the upper inlet 135 is a mechanically driven stream projecting impeller 137 preferably placed adjacent the open lower end 126 of the cone 123. Such an impeller can be mounted on any suitable means, such as on a quill shaft 138, which is journaled in a bearing 139 and can also be driven by the motor-reducer 117. The impeller 137 should be mounted on the quill shaft 138 in such a manner as to direct a flow of liquid downwardly and should be of such size and driven at such a speed as to provide for a flow of slurry downwardly through the open lower end of the cone 126 at least equal to the throughput of clarified water. It will be noted that if the flow into the upper zone 125 through the inlet 135 is twice the throughput, or output, of the apparatus, the downward outflow through the lower end 126 of the cone will equal the throughput—such outflow being less than the inflow by the amount of clarified water escaping over the weir 113.

Instead of using the impeller as just referred to as the means of causing the flow through the upper zone, this flow may sometimes be obtained by other means. Thus in some apparatus, and particularly so in smaller sizes, the baffles 136 may, as shown, extend out into the mixing space and serve together with the rotating agitator 121 in the bottom of the tank, as the flow causing means, the agitator imparting to the slurry in the lower space a rotary movement which is directed outwardly and upwardly to form a flow inward in the upper zone.

Raw water to be treated may be introduced through any suitable conduit, such as 140, preferably discharging into the lower part of the cone 123 below the upper inlet thereinto, as at 141. While considerable rotational movement of the slurry at the upper level of the slurry within the upper zone 125 is undesirable, it is not objectionable some distance below the surface. It is therefore sometimes desirable, as shown in Figure 5, to direct the water inlet 141 tangentially of the cone, and to discharge it over a horizontal baffle 142 in order to secure a substantial rotational movement in the lower part of the cone whereby the water and treating reagents can be thoroughly mixed in and with the slurry therein. The chemical treating reagents can be introduced in any desired manner as through chemical feed line 143 likewise discharging into the lower portion of the conical chamber 125 at a point removed from the raw water inlet 141, as shown, or reagent may be introduced together with water if preferred. It is also desirable to provide a solids concentrating chamber, such as 144, shown as placed adjacent the outer tank walls 111 in the mixing and reaction zone 124, although it could also be placed within the conical structure 123. Preferably the solids concentrator 144 will be provided with a sludge outlet 145 equipped with suitable valve 146.

When the apparatus of my invention first begins operation, water and treating reagents are introduced through their respective conduits 140 and 143, and the impeller 137 is rotated at one speed and the agitator 121 is rotated at a different speed. The impeller 137 should provide a downward flow of slurry in and from the upper zone 125 into the lower space of a volume at least equal to the throughput of treated water, and the agitator 121 should rotate at a speed sufficient to maintain all solids in the lower space in suspension. The liquid in the lower space will be given a rotational movement by the rotating blades 121 and will, due also to the action of the impeller 137, gradually rise in the lower, or agitation, space until it reaches the level of the slot 135. There the slurry, preferably in a volume of at least twice the throughput of clarified liquid, will be drawn into the upwardly expanding chamber and part will be drawn down by the action of the impeller 137 and again discharged into the lower space 124. After a period of operation, a substantial quantity of solids will be accumulated, in a state of suspension, in the lower space and in the lower part of the tapering chamber, in the form of a slurry containing an amount of suspended solids several times greater than is contained in or formed in an equal volume of water entering to be treated, and may reach several per cent by weight. Thereafter water and treating reagents are introduced into the circulating slurry and are mixed in and with the same. Obviously the path of circulation of the slurry is downwardly in the lower part of the tapering zone, and spirally and upwardly in the lower space 124 and returning into the upper zone 125 through the inlet or slot 135. Obviously, this construction results in an entirely new process, as the flow of liquid and solids in the lower portion of the upper zone is in a downward direction. Clarification is no longer due to the rise of water with suspended solids through a quiescent sludge filter but is secured entirely by the extrusion of water from the moving slurry. The process is decidedly new in that, as was described in connection with the apparatus of Figures 1 and 2, it requires the lateral flow of treated water with suspended solids into an upper portion of the upper chamber and its withdrawal downwardly from the point of introduction. There is thus no filtering action of the slurry, which I have found unnecessary and in some respects undesirable, as clear water separates from the slurry at the upper surface thereof and is then withdrawn from the upper portion of the upwardly expanding zone.

I have found that the pronounced circulation of the slurry in this way has beneficial effects in several respects; one, that with the definite but non-turbulent horizontal movement of slurry adjacent the upper level of slurry in the upper zone, clear water separates more readily from the slurry than where the movement of water is upward to the slurry surface through a deep sludge blanket or filter; another, that the continuous and relatively rapid downward flow of the slurry in the upper chamber carries the abandoned solids out of the way without permitting them to settle on the sides of the cone and this, together with the prevention of a stagnant condition as to solids in the upwardly tapering zone, prevents deterioration of solids in the slurry. Furthermore the solids are being constantly returned into the reaction space for growth and reconditioning. It will be seen that the movement in the lower part of the cone shaped chamber is a new type of flow, not only is it in a reverse direction of that heretofore used in such structure but is quite different in volume and velocity, and is part of a path of circulation instead of a throughflow. In prior art structures of this general type the aim has been to filter water, or slurry, upwardly through a sludge blanket, while I am to provide a definite horizontal flow of fresh slurry adjacent the treated water escape surface and the immediate withdrawal downwardly of the spent slurry with its abandoned solids. Actually, of course, with apparatus and operation as contemplated, clarification takes place in a vertically very narrow or shallow space within the upper chamber, the upper part of the chamber being filled with clarified water and the lower part being used as a flow space for return flow. As just described, this lower space is used for mixing and reaction as well as for downflow, and it is advantageously so used, but the water and reagent can be delivered into the lower space that has heretofore been called "mixing and reaction" space and good results obtained. The difference in terminology is used to avoid confusion with prior art, as actually I have a lower chamber and an upper chamber, in which mixing may take place in the lower part of the latter and in which clarification results from escape of clarified water from an escape surface.

It will be apparent that with the structure and operation set forth I have the advantage of fixing the level of slurry in the chamber where desired, and therewith the volume of slurry in the chamber and the clear water escape area, quite independently of the throughput rate, advantages that are not possible when the water rises vertically to escape through a so-called "sludge blanket" or "filter."

It will also be apparent that the conical shape of the upper chamber is no longer important. Such a structure was necessary when clarification resulted from filtering dosed water upwardly through a "sludge blanket" or suspended sludge filter. However in my new process clarification is by the extrusion of clear water from a horizontally moving slurry, with the associated removal of abandoned solids immediately by such flow and the return of such abandoned solids to the slurry agitation space for growth and reconditioning. Obviously such a process can be carried on in cylindrical chambers as well as conical. A conical structure such as that shown, is preferred in that it permits the utilization of large diameter tanks and small propeller sizes, with resultant savings therefrom, and avoids flat surfaces on which solids might accumulate.

The term "water" used herein and in the claims is intended to cover aqueous solutions of all kinds, such as, by way of illustration and not of limitation, water, waste waters, saline solutions such as brine and sea water, and other solutions in water. The term "slurry" is used in the sense in which it is coming to be used in the art, namely a suspension of water being treated and a quantity of solids accumulated from previously treated water several times greater than that in, or formed in, an equal quantity of water entering to be treated. The term "slurry process" or "slurry type treatment" or "process" is used to indicate a process in which a slurry is used for treating the water, that is, one in which water and reagent is mixed and reacted in and with a slurry.

Various modifications of the structures described will be evident to those familiar with the art, such as the use of branching flow arms in large structures, the use of a number of pumping means in the various arms in place of a single pump with a common conduit, etc. Applicant is well aware of modifications that may be made and that may at times be desirable to meet particular conditions. The figures and description herein are, therefore, not to be construed as limitations on the applicant but to merely constitute preferred embodiments of his invention, and forms from which the principles involved will be readily understood.

I claim:

1. In a water treating apparatus of the type wherein during operation there is maintained a pool of slurry having a clearly defined upper surface from which clear water escapes, said apparatus comprising a tank, a sloping wall structure in said tank dividing the same into a lower space which during operation is normally completely filled with said slurry and an upper zone which is of greater cross-sectional area in its upper portion than in the lower part thereof, in which zone is maintained the clear water escape surface within the vertical limits of said sloping wall structure, above which surface is a clarified water space and below which surface the zone is filled with slurry, said wall structure having an open passageway between said lower space and said upper zone at the lower end thereof, a clarified water outlet from the upper portion of said zone, an inlet for admitting water into the slurry containing part of the tank, means for delivering treating reagent to water to be treated, a waste discharge from the tank, and a power driven slurry moving member within the lower portion of the tank, means for delivering a horizontal flow subjacent said surface thereby improving the escape of clarified water therefrom, said means comprising a flow means between said lower space and said upper zone, said flow means opening horizontally within said upper zone at a level adjacent to but below the normal elevation of said surface, and means to cause flow between said lower space and said zone through said flow means.

2. In a slurry type water treating apparatus comprising a tank, a partition structure dividing said tank into a slurry agitation space and a quiescent zone, said partition structure being so constructed and arranged as to form an open lower passageway between said space and said zone, a power driven agitator in said agitation space, a clarified water outlet from the upper part of the quiescent zone, means for delivering water to be treated and a treating reagent into said slurry agitation space, and a waste discharge from said tank, the improvement which comprises means for causing a lateral movement of the contents of said quiescent zone at a predetermined level therein above said lower passageway, said means comprising a conduit opening at one end into said space and extending across said zone at an elevation adjacent said predetermined level, power driven pumping means joined to said conduit, and spaced openings in said conduit adjacent said level.

3. A slurry type water treating apparatus of the type wherein a slurry is maintained in a slurry holding space and clear water escapes from a slurry surface into and through an overlying clarified liquid space comprising a tank, means for delivering water and a reagent into the slurry holding space of said tank, a waste discharge from said tank, a sloping wall structure in said tank dividing the space within said tank into a lower space and an upper space having a zone of gradually upwardly increasing cross-sectional area, said slurry holding space including all of the lower space and the lower portion of said upper space, a flow means connecting said lower space and the lower part of said upper space, a clarified water outlet from the upper part of the upper space, and means for causing a definite horizontally directed flow in said zone of upwardly increasing cross-sectional area at a predetermined level therein, said means comprising a second flow means connecting said lower space and said zone, said last mentioned flow means opening horizontally to said zone adjacent said predetermined level, and a power driven rotary liquid moving member.

4. A slurry type water treating apparatus comprising a tank, a waste discharge from said tank, a partition structure in said tank dividing the same into a slurry agitation space and a second space and so positioned as to form in the latter a zone of upwardly expanding cross-sectional area, in which zone is maintained during operation, within predetermined levels therein, a clear water escape surface, above which surface is maintained a body of clarified water and below which is a body of slurry, said partition structure having an open passageway between said slurry agitation space and said second space at the lower end thereof, means for delivering water and reagent into the slurry containing portion of said tank, a clarified water outlet from the upper portion of said second space, a power driven agitator in said slurry agitation space, and means for maintaining said escape surface at its predetermined level comprising means forming a second open passageway between said slurry agitation space and said zone, said second passageway opening horizontally to said zone at a level adjacent to but below the predetermined level of the escape surface, and a power driven pumping member so mounted in said tank as to cause a forced flow of slurry through said second passageway.

5. In water treating apparatus of the type wherein a slurry is maintained in a slurry holding space and clear water escapes from a slurry surface into and through an overlying clarified liquid space, said apparatus comprising a tank, a partition structure in said tank dividing it into an inner chamber and an outer space and having an open passageway between said chamber and said outer space at the lower end thereof, means for admitting water and a reagent into the slurry containing part of said tank, an outlet for clarified water from the upper part of said chamber, an outlet to waste from said tank, and agitating means within said outer space: means for facilitating escape of clear water from said slurry surface, said means comprising a conduit between said space and said chamber, said conduit opening horizontally to said chamber at a level adjacent to the normal level of the slurry surface in the chamber during operation, a power driven pumping member, said member being of such size and so positioned as, on operation thereof, to cause a circulation of slurry within said tank through a path embracing the lower part of said chamber, said space, said open passageway and said conduit, whereby there is maintained a positive horizontal flow of slurry in the chamber adjacent the slurry surface therein.

6. A slurry type water treating apparatus comprising a tank, a waste discharge from said tank, a sloping wall structure in said tank dividing the space within said tank into a lower space and an upper space having a zone of gradually upwardly increasing cross sectional area, said lower space and the lower portion of the upper space being normally filled with slurry, said wall structure being so constructed and arranged as to form an open passageway between said lower space and the lower part of said upper space, inlet means for admitting water and reagent into the slurry containing portion of said tank, a clarified water outlet from the upper part of the upper space, and means for causing a definite, horizontally directed flow in said zone of upwardly increasing cross-sectional area at a predetermined level therein, said means comprising distribution members extending horizontally in said zone at the predetermined level therein, horizontally facing orifices in said distribution members, a conduit between said distribution members and said lower space, and a rotary power driven liquid moving member in said conduit.

7. A slurry type water treating apparatus comprising a tank, a waste discharge from said tank, a sloping wall structure in said tank dividing the space within said tank into a lower space and an upper space having a zone of gradually upwardly increasing cross sectional area, said lower space and the lower portion of said upper space being normally filled with slurry, said wall structure being so constructed and arranged as to form an open passageway between said lower space and the lower part of said upper space, inlet means for admitting water and reagent into the slurry containing portion of said tank, a clarified water outlet from the upper part of the upper space, and means for causing a definite, horizontally directed flow in said zone of upwardly increasing cross-sectional area at a predetermined level therein, said means comprising a slot in said sloping wall adjacent said predetermined level, and a rotary power driven liquid moving member so constructed and arranged as to cause a downward flow through the lower part of said zone.

8. Apparatus as described in claim 3 wherein the second flow means between the said zone and said lower space is at a level at least about one-half the distance from the first flow means to the clarified water outlet.

9. The apparatus of claim 3 wherein the power driven liquid moving member is of such size and is arranged to operate at such speed as to cause a flow from said predetermined level back to said lower space in an amount of not less than about the output of clarified water.

10. In combination with a water treating apparatus wherein a slurry is maintained in a slurry holding space and clear water escapes from a slurry surface into and through an overlying clarified liquid space, said apparatus including a tank, inlet means for admitting water and a treating reagent into the slurry holding space of said tank, a partition structure in said tank dividing the same into an agitation chamber and a clarification chamber having a zone of gradually upwardly increasing cross-sectional area said partition structure being so constructed and arranged as to form a passageway between said chambers at the lower end of said partition structure, said slurry holding space comprising the agitation chamber and the lower part of the clarification chamber, a power driven agitator in said agitation chamber, an outlet for withdrawing treated water from the upper part of said clarification chamber, and an outlet for solids from said tank: means for inducing a horizontal flow of water in said clarification chamber which comprises distribution members in said zone and having spaced, horizontally facing outlet openings in said zone, conduit means leading from said agitation chamber and discharging into the distribution members, and power driven pumping means positioned to cause flow through said conduit means.

11. In combination with a water treating apparatus comprising a tank, a partition structure in said tank dividing the same into a lower space and an upper chamber and positioned to form in the latter a zone of gradually increasing cross sectional area, said partition structure being so constructed and arranged as to form a passageway between said space and said chamber at the lower end thereof, the lower space and the lower portion of said upper chamber constituting during operation a slurry holding space, means for admitting water and a reagent into the slurry holding space of said tank, power driven rotary slurry agitating means in said lower space, an outlet for treated water from the upper part of said upper chamber and a solids outlet from said tank: means for inducing a flow of slurry from said upper chamber into the lower space which comprises pick-up members in said zone and having spaced, horizontally facing inlet openings in said upper chamber, conduit means leading from said pick-up members and discharging into the lower space, and power driven pumping means positioned to cause flow through said conduit.

12. Water treating apparatus comprising a tank, a sloping wall structure in said tank dividing the same into a lower space and a zone of downwardly decreasing cross-sectional area, an inlet into an intermediate portion of said zone from said space, an outlet from the lower portion of said zone into said space, a mechanically driven liquid moving member in said zone so arranged as to cause a flow of water downwardly through the lower portion of said zone, means for delivering water and a treating reagent into the lower portion of said zone, means for withdrawing solids from said tank, an agitator in said space, and means for withdrawing treated water from the upper portion of said zone.

13. In a water treating apparatus comprising a tank, a sloping wall structure in said tank forming therein a zone of greater cross-sectional area in its upper part than in the lower part thereof and a mixing space and a passageway between the lower end of said zone and said space, the space and lower portion of the zone normally being filled with slurry and the upper portion of said zone normally being filled with clarified water, means in said space for rotatively mixing the contents thereof, means for delivering water and a treating reagent into the slurry portion of the tank, means for withdrawing excess solids from said tank and an outlet for withdrawing treated water from the upper portion of the zone: means for providing a horizontal flow in said zone at a predetermined level intermediate the top and bottom of said sloping wall structure which comprises a conduit opening at one end into said mixing space and at the other end opening horizontally into said zone adjacent said predetermined level, and a mechanically driven pumping member in said conduit.

14. In a water treating apparatus including a tank, a partition structure in said tank dividing the same into an agitation space and a second space and so positioned as to form in the latter a zone of upwardly increasing cross-sectional area, said agitation space and the lower portion of said second space forming a water treating zone and the upper portion of said second space forming a treated water zone, a first passageway between said spaces at the lower end of said partition, a power driven agitator in said agitation space, means for delivering water to be treated and a treating reagent into said water treating zone, means for withdrawing excess solids from said tank and an outlet for withdrawing treated water from the upper portion of said second space, the combination which comprises a second passageway between said spaces, said second passageway opening horizontally within said second space at a level spaced above said first passageway and below said outlet, and means to cause a flow of slurry through said second passageway.

15. In the method of purifying water which comprises agitating the water to be treated and a precipitating reagent in a slurry in a lower space, introducing slurry into the lower portion of a zone of upwardly increasing cross-sectional area at a velocity sufficient to support substantially all of the precipitate therein, passing said mixture upwardly through said zone wherein fine precipitate aggregates and the upward velocity of said water progressively diminishes, the velocity at an intermediate portion of said zone becoming insufficient to support said precipitate whereby a velocity supported blanket of precipitate is maintained below said intermediate portion of said zone and a zone of slowly rising clear water is secured above said intermediate portion, the improvement which comprises pumping a substantial amount of water with contained precipitate from adjacent the top of said velocity supported blanket and into the lower space, thereby establishing a positive circulation of slurry between said top of said velocity supported blanket and said lower space.

16. In the method of purifying water which comprises introducing the water to be treated and a precipitating reagent into an agitation space and there mixing the same in and with a slurry containing solids accumulated from previously treated water, introducing a mixture of water and solids into the lower portion of a zone of upwardly increasing cross-sectional area at a velocity sufficient to support substantially all of the precipitate therein, passing said mixture upwardly through said zone wherein fine precipitate aggregates and the upward velocity of said water progressively diminishes, the velocity at an intermediate portion of said zone becoming insufficient to support said precipitate, whereby a velocity supported blanket of precipitate is maintained below said intermediate portion of said zone and a zone of slowly rising clear water is secured above said intermediate portion, withdrawing treated water from the upper portion of said zone, and withdrawing excess solids from said tank, the improvement which comprises maintaining a positive horizontal flow of slurry adjacent the upper surface of said velocity supported blanket.

17. In a water treating process wherein water to be treated and a treating reagent are mixed in and with a slurry containing solids accumulated from previously treated water, slurry is passed into a zone of downwardly decreasing cross-sectional area, clarified and treated water is withdrawn from an upper portion of said zone and solids are withdrawn to waste, the improvement which comprises introducing slurry into the said zone as a horizontally flowing stream at a level adjacent the upper level of the slurry maintained therein and passing slurry downwardly through the lower portion of said zone.

18. In a water treating process wherein water to be treated and a treating reagent are mixed in and with a slurry containing an amount of precipitate separated and accumulated from previously treated water several times the amount of solids formed in an equal volume of water, slurry is passed into a zone of upwardly increasing cross-sectional area, clarified and treated water is withdrawn from an upper portion of said zone, and solids are withdrawn to waste, the improvement which comprises maintaining the upper slurry surface at a predetermined level in said zone a substantial distance above the lower end of said zone, continually passing a flow of slurry horizontally adjacent said surface, and returning slurry downwardly from said surface into a lower level of said slurry.

19. A method of treating water which comprises establishing a body of water undergoing treatment, maintaining a body of slurry in the lower portion of said body of water, agitating said slurry sufficiently to prevent deposit of solids therefrom, mixing water to be treated and a precipitating reagent in and with said slurry, withdrawing clarified water upwardly from the upper surface of said body of slurry, passing a flow of slurry in amount substantially greater than the rate of output of treated water horizontally below and adjacent said upper surface, withdrawing slurry downwardly from said horizontal flow and removing excess solids from said body of slurry.

20. In a water treating process which includes maintaining a pool of slurry in the lower portion of a body of water undergoing treatment, agitating said slurry sufficiently to prevent deposit of solids therefrom, mixing water to be treated and a treating reagent in and with said slurry, passing a flow of slurry into a zone of upwardly expanding cross-sectional area, separating treated water from the upper surface of slurry in said zone, withdrawing such separated treated water from above said upper surface, and withdrawing solids to waste, the improvement which comprises pumping a substantial amount of slurry from said pool of slurry into said upwardly expanding zone and directing the flow caused by such pumping horizontally below the upper surface of the slurry in said zone, said flow creating a substantial horizontal movement of slurry at said upper surface.

21. The method of treating water which comprises maintaining a body of slurry having a clearly defined upper surface from which clear water escapes, mixing water to be treated and a precipitating reagent in and with a relatively large volume of slurry in a lower portion of said body of slurry, separating clarified water from slurry at said upper slurry surface, and withdrawing solids from said body of slurry, characterized by maintaining a positive horizontal flow of a considerable volume of slurry immediately below said upper surface, and passing at least a portion of the horizontally flowing slurry to a lower level of said body of slurry, whereby the solids in the body of slurry at the upper surface are continuously changed and reconditioned.

22. The process of claim 21 wherein the volume of slurry returned from the upper surface to the lower portion of the body of slurry is of the order of at least about that of the throughput of clarified water.

23. The method of purifying water which comprises maintaining a body of slurry having a clearly defined upper surface from which clear water escapes, mixing water to be treated and a precipitating reagent in and with a relatively large volume of slurry in a lower portion of said body of slurry, separating clarified water from slurry at said upper slurry surface, and withdrawing solids from said body of slurry, characterized by maintaining a positive lateral flow of slurry adjacent said escape surface.

24. In water treating apparatus including a tank having a lower mixing space and a superposed upwardly expanding clarification zone, means forming a passageway between the lower part of said zone and said space, means for admitting water to be treated and a treating reagent into the lower part of said tank, means for rotatively agitating and mixing the contents of said mixing space, an outlet for treated water from the upper part of said zone, and a solids outlet from a lower part of said mixing space: a means for inducing a positive circulation of liquid and contained solids embracing the lower part of said zone and at least a portion of said mixing space which comprises a conduit opening at one end into said space and extending upwardly into said zone to an intermediate level therein, a laterally facing opening at the upper end of said conduit, and a power driven pumping means in said conduit.

25. A water treating apparatus comprising a tank, a partition structure in said tank dividing the same into a lower space and an upper chamber having a zone of gradually upwardly increasing cross-sectional area, an inlet means from said lower space into said upper chamber at the lower end of said partition structure, a treated water outlet from the upper portion of said upper chamber, an outlet means from said upper chamber leading into said lower space, said outlet means being spaced a substantial distance above said inlet means and opening horizontally within said zone at a level intermediate the vertical limits of said zone, means to cause a flow between said space and said zone through said outlet means, a power driven agitator in said lower space, inlet means for admitting water to be treated and a treating reagent into said tank at a level below said intermediate level, and a solids outlet from said tank.

26. In a water treating apparatus of the type wherein during operation there is maintained a pool of slurry having a clearly defined upper surface from which clear water escapes, said apparatus comprising a tank, partition means within said tank dividing the same into an agitation space which during operation is normally completely filled with slurry and a quiescent zone in which during operation is normally maintained the clear water escape surface, above which surface is a clarified water space and below which surface the zone is filled with slurry, a clarified water outlet from the upper portion of said zone, said partition being so constructed and arranged as to form an open passageway between said agitation space and the lower portion of said zone, a power driven agitator in said agitation space, an inlet for admitting water and a treating reagent into the slurry containing part of the tank, and a waste discharge from said tank, means for causing a positive horizontal flow of slurry adjacent the level at which the escape surface is normally maintained, said means comprising flow members extending horizontally across said zone adjacent said level, spaced horizontally facing orifices in said flow members, a conduit connected to said flow members and leading to a lower level in said tank, and pumping means in said conduit.

WALTER H. GREEN.

REFERENCES CITED

The following references are of record in the file of this patent:

UNITED STATES PATENTS

| Number | Name | Date |
|---|---|---|
| 790,482 | Declercq | May 23, 1905 |
| 2,021,672 | Spaulding | Nov. 19, 1935 |
| 2,296,437 | Green | Sept. 22, 1942 |
| 748,308 | Reisert | Dec. 29, 1903 |
| 1,030,366 | Winters | June 25, 1912 |
| 1,702,256 | Green | Feb. 19, 1929 |
| 1,702,257 | Green | Feb. 19, 1929 |
| 2,127,314 | Spaulding | Aug. 16, 1938 |
| 2,245,583 | Green | June 17, 1941 |
| 2,245,587 | Hughes | June 17, 1941 |
| 2,245,588 | Hughes | June 17, 1941 |
| 2,314,977 | Green | Mar. 30, 1943 |
| 630,309 | Aberg | Aug. 8, 1899 |
| Re. 22,194 | Green | Oct. 6, 1942 |
| 2,276,300 | Green | Mar. 17, 1942 |
| 2,348,122 | Green | May 2, 1944 |
| 2,348,123 | Green et al. | May 2, 1944 |
| 2,348,124 | Green | May 2, 1944 |
| 2,338,986 | Waterman | Jan. 11, 1944 |
| 1,778,286 | Anson | Oct. 14, 1930 |

FOREIGN PATENTS

| Number | Country | Date |
|---|---|---|
| 456,209 | Germany | Sept. 10, 1928 |